United States Patent
Watanabe et al.

(10) Patent No.: US 9,931,756 B2
(45) Date of Patent: Apr. 3, 2018

(54) METHOD FOR PRODUCING SEPARATOR AND METHOD FOR SLITTING

(71) Applicant: SUMITOMO CHEMICAL COMPANY, LIMITED, Tokyo (JP)

(72) Inventors: Koichiro Watanabe, Niihama (JP); Tatsuya Kataoka, Niihama (JP); Kiyomu Nomura, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 14/780,570

(22) PCT Filed: May 26, 2015

(86) PCT No.: PCT/JP2015/065009
§ 371 (c)(1),
(2) Date: Sep. 28, 2015

(87) PCT Pub. No.: WO2016/103754
PCT Pub. Date: Jun. 30, 2016

(65) Prior Publication Data
US 2016/0325446 A1 Nov. 10, 2016

(30) Foreign Application Priority Data
Dec. 25, 2014 (JP) ................. 2014-263593

(51) Int. Cl.
*H01M 2/14* (2006.01)
*H01M 2/16* (2006.01)
(Continued)

(52) U.S. Cl.
CPC .............. *B26D 1/025* (2013.01); *B26D 1/02* (2013.01); *B26D 1/03* (2013.01); *B26D 1/035* (2013.01);
(Continued)

(58) Field of Classification Search
CPC .... H01M 10/0525; H01M 2/14; H01M 2/145; H01M 2/16; H01M 2/1686; B26D 1/025;
(Continued)

(56) References Cited

U.S. PATENT DOCUMENTS

2002/0132162 A1* 9/2002 Takata ................... B26D 1/025
429/129
2003/0000360 A1* 1/2003 Sanda .................. B65H 18/106
83/495

(Continued)

FOREIGN PATENT DOCUMENTS

| JP | 11-180605 A | 7/1999 |
| JP | 2002-037491 A | 2/2002 |

(Continued)

OTHER PUBLICATIONS

Japanese Office Action for JP 2015-527710 dated Sep. 1, 2015.
(Continued)

*Primary Examiner* — Karie O' Neill Apicella
(74) *Attorney, Agent, or Firm* — Sughrue Mion, PLLC

(57) ABSTRACT

Provided is a method for producing a separator which method less causes a tear in the separator. The method is a method for producing a separator by slitting, in a direction in which a separator original sheet (12b) being porous is conveyed, the separator original sheet (12b) into a plurality of separators (12a), including the steps of: (a) conveying the separator original sheet (12b) in a state where the separator original sheet (12b) is in contact with a roller (77); and (b) slitting the separator original sheet (12b) at a portion where the separator original sheet (12b) is in contact with the roller (77).

12 Claims, 8 Drawing Sheets

(51) Int. Cl.
    *H01M 10/0525* (2010.01)
    *B26D 1/02* (2006.01)
    *B26D 7/26* (2006.01)
    *B26D 1/03* (2006.01)
    *B26D 3/00* (2006.01)
    *B26D 1/24* (2006.01)
    *B26D 7/18* (2006.01)
    *B65H 35/02* (2006.01)
    *B65H 18/02* (2006.01)

(52) U.S. Cl.
    CPC ............. *B26D 3/00* (2013.01); *B26D 7/18* (2013.01); *B26D 7/2614* (2013.01); *B65H 18/021* (2013.01); *B65H 35/02* (2013.01); *H01M 2/145* (2013.01); *H01M 2/1653* (2013.01); *B65H 2301/4148* (2013.01); *B65H 2301/41282* (2013.01); *B65H 2801/72* (2013.01); *H01M 2/1686* (2013.01); *H01M 10/0525* (2013.01)

(58) Field of Classification Search
    CPC ...... B26D 7/2614; B26D 7/7126; B26D 3/00; B26D 1/02; B26D 1/03; B26D 1/035; B26D 1/24; B26D 1/245; B26D 7/26; B26D 7/18
    See application file for complete search history.

(56) References Cited

U.S. PATENT DOCUMENTS

| | | | |
|---|---|---|---|
| 2009/0325058 A1* | 12/2009 | Katayama | H01G 9/02 429/142 |
| 2012/0024123 A1 | 2/2012 | Nakajima et al. | |
| 2012/0174386 A1 | 7/2012 | Katayama et al. | |
| 2014/0374947 A1 | 12/2014 | Ichinomiya et al. | |

FOREIGN PATENT DOCUMENTS

| | | |
|---|---|---|
| JP | 2002-273684 A | 9/2002 |
| JP | 2005-066796 A | 3/2005 |
| JP | 2005-230968 A | 9/2005 |
| JP | 3164798 U | 12/2010 |
| JP | 2011-148035 A | 8/2011 |
| JP | 2011-159434 A | 8/2011 |
| JP | 2011-178532 A | 9/2011 |
| JP | 2011-200884 A | 10/2011 |
| JP | 2013-243059 A | 12/2013 |
| JP | 2013254595 A * | 12/2013 ............. H01M 4/04 |
| JP | 2014-012391 A | 1/2014 |
| JP | 2014-200875 A | 10/2014 |
| KR | 10-2014-0107256 A | 9/2014 |
| WO | 2008/013114 A1 | 1/2008 |
| WO | 2008/143005 A1 | 11/2008 |
| WO | 2010/119527 A1 | 10/2010 |

OTHER PUBLICATIONS

Communication dated Feb. 2, 2016 from the Japanese Patent Office issued in corresponding Application No. 2015-527710.
International Search Report for PCT/JP2015/065009 dated Sep. 1, 2015.
Communication from the State Intellectual Property Office of the People's Republic of China dated Mar. 22, 2017 in corresponding Chinese Patent Application No. 201580000444.8.
Hideo Mukai, "Suritta, riwainda no gijutsu dokuhon ( technical book for slitter and rewinder)", the augmented edition, Converting Technical Institute, Dec. 5, 2012, pp. 37-43 (29 pages total).
Notification of Reasons for Revocation for JP Patent No. 5951900 dated Feb. 23, 2017.
International Preliminary Report on Patentability dated Jul. 6, 2017, in counterpart International Application No. PCT/JP2015/065009.
Petition for Patent Cancellation dated Aug. 28, 2017 filed in the Korean Intellectual Property Office in counterpart application No. 10-1717392.
Communication dated Oct. 9, 2017 issued by the State Intellectual Property Office of the People's Republic of China in corresponding Chinese Patent Application No. 201580000444.8.
Communication received Jun. 30, 2017 from the Japanese Patent Office in counterpart application No. 2017-700026.

* cited by examiner

METHOD FOR PRODUCING SEPARATOR AND METHOD FOR SLITTING

CROSS REFERENCE TO RELATED APPLICATIONS

This application is a National Stage of International Application No. PCT/JP2015/065009 filed May 26, 2015, claiming priority based on Japanese Patent Application No. 2014-263593 filed Dec. 25, 2014, the contents of all of which are incorporated herein by reference in their entirety.

TECHNICAL FIELD

The present invention relates to a separator for use in a lithium-ion secondary battery. In particular, the present invention relates to a method for producing a separator and a method for slitting a separator original sheet.

BACKGROUND ART

Conventionally, a resin film material (such as a film and a sheet) has been widely used as a material of a separator for use in a battery. The resin film material, of which a separator original sheet is made up, is produced by being stretched in a width direction (transverse direction). This causes the resin film material to be a porous film material in which fine pores are formed in submicron order. The separator original sheet, which is made up of such a porous film material, is slit, by a slitting apparatus, into a plurality of separators each having a desired width (Patent Literature 1).

CITATION LIST

Patent Literature

[Patent Literature 1]
Japanese Patent Application Publication Tokukai No. 2002-273684 (Publication date: Sep. 25, 2002)

SUMMARY OF INVENTION

Technical Problem

However, since the separator original sheet made up of such a film material is porous, there has been the following problem. That is, in a case where vibration occurs while the separator original sheet is being slit, an unnecessary force may act on a slit portion of the separator original sheet, so that a resultant separator may be tore in an unexpected direction.

The object of the present invention is to provide a method for producing a separator and a method for slitting a separator original sheet, each of which less causes a tear in a separator.

Solution to Problem

In order to attain the above object, a method for producing a separator in accordance with the present invention is a method for producing a separator by slitting, in a direction in which a separator original sheet being porous is conveyed, the separator original sheet into a plurality of separators, the method including the steps of: (a) conveying the separator original sheet in a state where the separator original sheet is in contact with a roller; and (b) slitting the separator original sheet at a portion where the separator original sheet is in contact with the roller.

In order to attain the above object, a method for producing a separator in accordance with the present invention includes the steps of: (a) slitting, in a direction in which a separator original sheet being porous is conveyed, the separator original sheet into a plurality of separators; and (b) separating, on a downstream side of a position at which the separator original sheet is slit in the step (a), one or more of the plurality of separators and another one or more of the plurality of separators.

In order to attain the above object, a method for slitting a separator original sheet in accordance with the present invention is a method for slitting, in a direction in which a separator original sheet being porous is conveyed, the separator original sheet into a plurality of separators, including the steps of: conveying the separator original sheet in a state where the separator original sheet is in contact with a roller; and slitting the separator original sheet at a portion where the separator original sheet is in contact with the roller.

In order to attain the above object, a method for slitting a separator original sheet in accordance with the present invention includes the steps of: (a) slitting, in a direction in which the separator original sheet is conveyed, the separator original sheet into a plurality of separators; and (b) separating, on a downstream side of a position at which the separator original sheet is slit in the step (a), one or more of the plurality of separators and another one or more of the plurality of separators.

Advantageous Effects of Invention

According to the present invention, it is possible to provide a method for producing a separator and a method for slitting a separator original sheet, each of which less causes a tear in a separator.

DESCRIPTION OF EMBODIMENTS

Embodiment 1

The following description will discuss, in order, a lithium-ion secondary battery, a separator, a heat-resistant separator, a method for producing the heat-resistant separator, a slitting apparatus, and a cutting section in accordance with Embodiment 1 of the present invention.

(Lithium-Ion Secondary Battery)

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
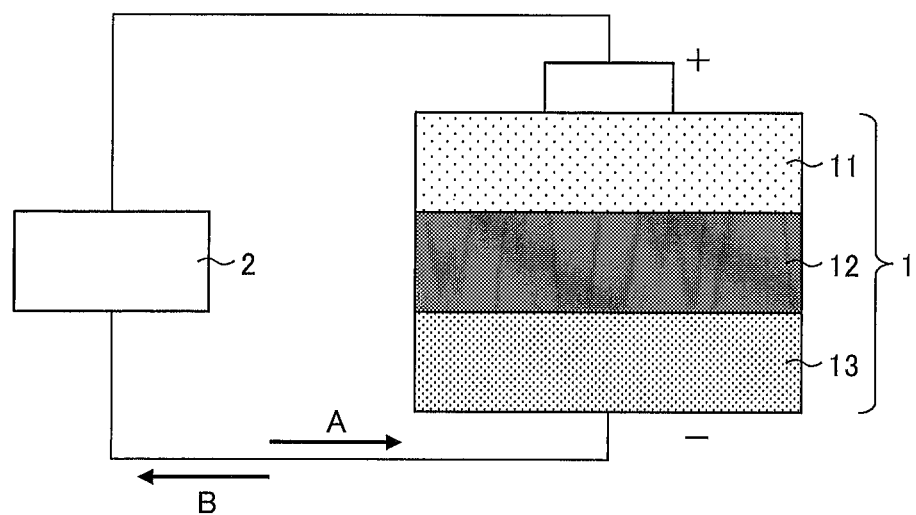
FIG. 1 is a schematic view illustrating a cross sectional configuration of a lithium-ion secondary battery in accordance with Embodiment 1.

FIG. 1 is a schematic view illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between (i) the cathode 11 which is a positive electrode of the lithium-ion secondary battery 1 and (ii) the anode 13 which is a negative electrode of the lithium-ion secondary battery 1. The separator 12 separates the cathode 11 and the anode 13, allowing lithium ions to move between the cathode 11 and the anode 13. The separator 12 contains, for example, polyolefin such as polyethylene or polypropylene as a material.

Figure 2A:
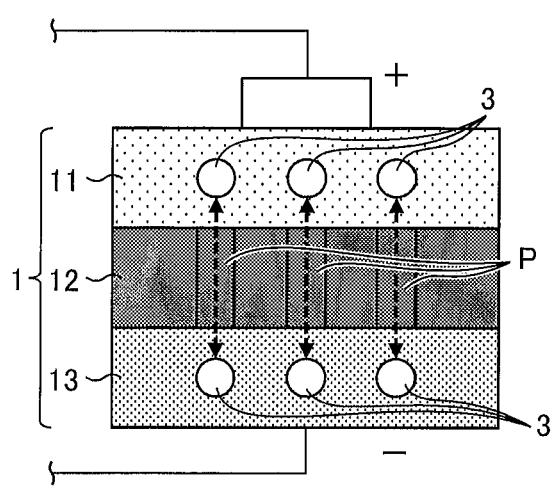
FIGS. 2A, 2B and 2C are schematic views illustrating details of the configuration of the lithium-ion secondary battery illustrated in FIG. 1.
Figure 2B:
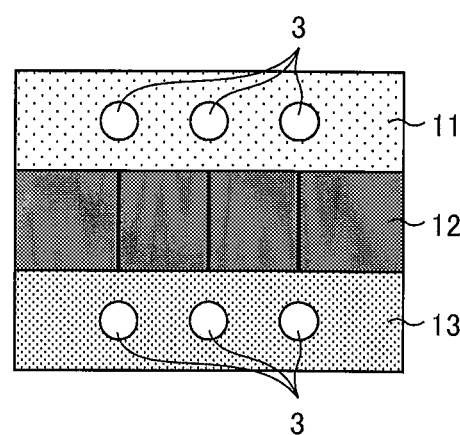
Figure 2C:
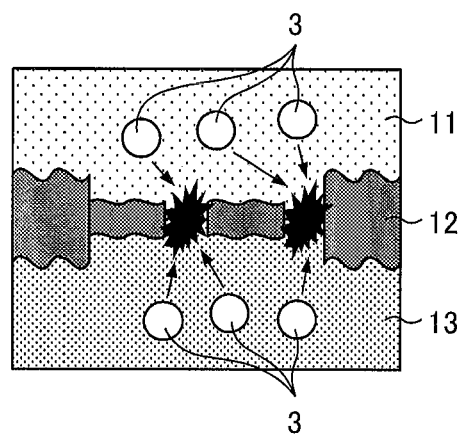

FIGS. 2A, 2B and 2C are schematic views illustrating details of the configuration of the lithium-ion secondary battery 1 illustrated in FIG. 1. FIG. 2A illustrates a normal configuration. FIG. 2B illustrates a state in which a temperature of the lithium-ion secondary battery 1 has risen. FIG. 2C illustrates a state in which a temperature of the lithium-ion secondary battery 1 has sharply risen.

As illustrated in FIG. 2A, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens, and the pores P are blocked as illustrated in FIG. 2B. As a result, the separator 12 shrinks. This stops the above back-and-forth movement of the lithium ions 3, and consequently stops the above temperature rise.

However, in a case where a temperature of the lithium-ion secondary battery 1 sharply rises, the separator 12 suddenly shrinks. In this case, as illustrated in FIG. 2C, the separator 12 may be destroyed. Then, the lithium ions 3 leak out from the separator 12 which has been destroyed. As a result, the lithium ions 3 do not stop moving back and forth. Consequently, the temperature continues rising.

(Heat-Resistant Separator)

Figure 3A:
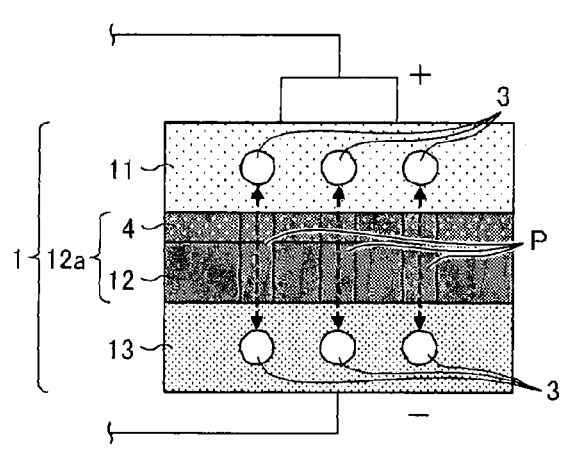
FIGS. 3A and 3B are schematic views illustrating another configuration of the lithium-ion secondary battery illustrated in FIG. 1.
Figure 3B:
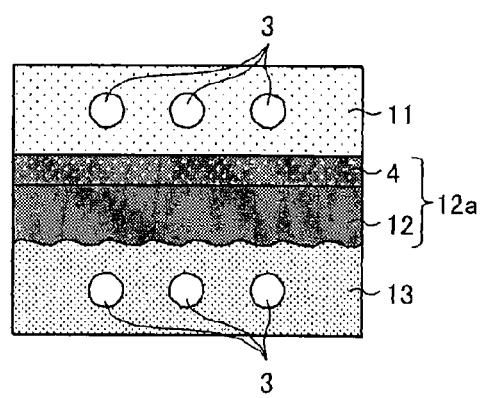

FIGS. 3A and 3B are schematic views illustrating another configuration of the lithium-ion secondary battery 1 illustrated in FIG. 1. FIG. 3A illustrates a normal configuration, and FIG. 3B illustrates a state in which a temperature of the lithium-ion secondary battery 1 has sharply risen.

As illustrated in FIG. 3A, the lithium-ion secondary battery 1 can further include a heat-resistant layer 4. The heat-resistant layer 4 and the separator 12 form a heat-resistant separator 12a (separator). The heat-resistant layer 4 is laminated on a surface of the separator 12 which surface is on a cathode 11 side. Note that the heat-resistant layer 4 can be alternatively laminated on a surface of the separator 12 which surface is on an anode 13 side, or on both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in FIG. 3B, even in a case where the temperature of the lithium-ion secondary battery 1 sharply rises and accordingly the separator 12 melts or softens, the shape of the separator 12 is maintained because the heat-resistant layer 4 supports the separator 12. Therefore, such a sharp temperature rise results in only melting or softening of the separator 12 and consequent blocking of the pores P. This stops back-and-forth movement of the lithium ions 3 and consequently stops the above-described excessive discharging or excessive charging. In this way, the separator 12 can be prevented from being destroyed.

(Production Steps of Heat-Resistant Separator Original Sheet (Separator Original Sheet))

How to produce the heat-resistant separator 12a of the lithium-ion secondary battery 1 is not specifically limited. The heat-resistant separator 12a can be produced by a well-known method. The following discussion assumes a case where the separator 12 contains polyethylene as a main material. However, even in a case where the separator 12 contains another material, the similar steps can still be applied to production of the separator 12.

For example, it is possible to employ a method including the steps of first forming a film by adding a plasticizer to a thermoplastic resin, and then removing the plasticizer with an appropriate solvent. For example, in a case where the separator 12 is made of a polyethylene resin containing ultrahigh molecular weight polyethylene, it is possible to produce the separator 12 by the following method.

This method includes (1) a kneading step of obtaining a polyethylene resin composition by kneading a ultrahigh molecular weight polyethylene with an inorganic filler such as calcium carbonate, (2) a rolling step of forming a film with the polyethylene resin composition, (3) a removal step of removing the inorganic filler from the film obtained in the step (2), and (4) a stretching step of obtaining the separator 12 by stretching the film obtained in the step (3).

In the removal step, many fine pores are provided in the film. The fine pores of the film stretched in the stretching step become the above-described pores P. The separator 12 formed as a result is a polyethylene microporous film having a prescribed thickness and a prescribed air permeability.

Note that, in the kneading step, 100 parts by weight of the ultrahigh molecular weight polyethylene, 5 parts by weight to 200 parts by weight of a low-molecular weight polyolefin having a weight-average molecular weight of 10000 or less, and 100 parts by weight to 400 parts by weight of the inorganic filler can be kneaded.

Thereafter, in a coating step, the heat-resistant layer 4 is formed on a surface of the separator 12. For example, on the separator 12, an aramid/NMP (N-methylpyrrolidone) solution (coating solution) is applied, and thereby, the heat-resistant layer 4 that is an aramid heat-resistant layer is formed. The heat-resistant layer 4 can be provided on only one surface or both surfaces of the separator 12. Alternatively, the heat-resistant layer 4 can be formed by using, for coating, a mixed solution containing a filler such as alumina/carboxymethyl cellulose.

A method of coating the separator 12 with a coating solution is not specifically limited as long as uniform wet coating can be performed by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film or a solid-content concentration in the coating solution.

It is possible to use a resin film, a metal belt, a drum or the like as a support with which the separator 12 is fixed or transferred in coating.

It is thus possible to produce a heat-resistant separator original sheet 12b (hereinafter, merely referred to as "separator original sheet 12b") which is a separator original sheet on which the heat-resistant layer 4 is laminated (forming step). The separator original sheet 12b thus produced is wound around a core 53 having a cylindrical shape. Note that a subject to be produced by the above production method is not limited to the separator original sheet 12b. The above production method does not necessarily include the coating step. In a case where the method includes no coating step, the subject to be produced is a separator original sheet corresponding to the separator 12.

(Configuration of Slitting Apparatus 6)

Figure 4:
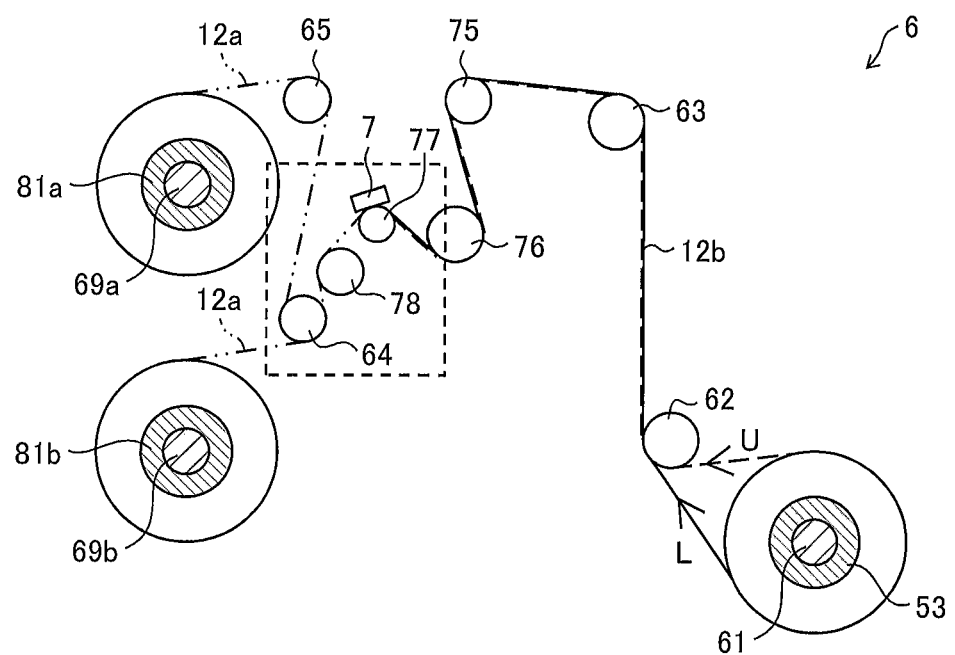
FIG. 4 is a schematic view illustrating a configuration of a slitting apparatus for slitting a separator original sheet for used in the lithium-ion secondary battery.
Figure 5:
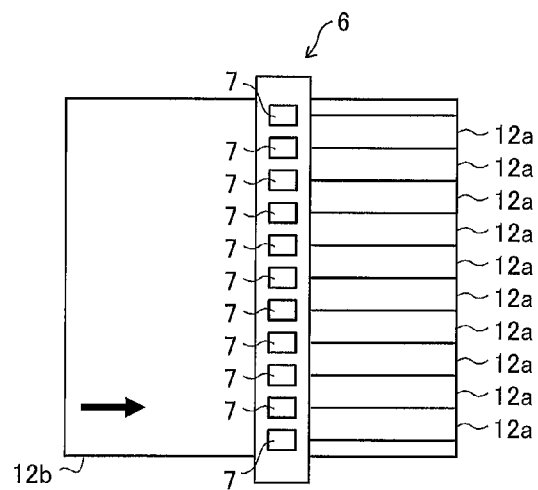
FIG. 5 is a plan view illustrating the slitting apparatus, the separator original sheet, and separators.

FIG. 4 is a schematic view illustrating a configuration of a slitting apparatus 6 for slitting the separator original sheet 12b so that the separator 12 to be provided in the lithium-ion secondary battery 1 illustrated in FIG. 1 is produced. FIG. 5 is a plan view illustrating the slitting apparatus 6, the separator original sheet 12b, and a plurality of separators 12a.

The slitting apparatus 6 includes a wind-off roller 61. The wind-off roller 61 has a cylindrical shape and is rotatably supported. The core 53, which has a cylindrical shape and around which the separator original sheet 12b is wound, is fitted to the wind-off roller 61. The separator original sheet 12b is wound off from the core 53 to a route U or L. The separator original sheet 12b thus unwound is conveyed to a roller 77 via rollers 62, 63, 75, and 76 at a maximum speed of, for example, 100 m/min., and is wound on the roller 77.

The slitting apparatus 6 includes cutting sections 7 (slitting mechanism). Each of the cutting sections 7 slits the separator original sheet 12b at a portion where the separator original sheet 12b is in contact with the roller 77, in a lengthwise direction (direction in which the separator original sheet 12b is conveyed (MD: Machine Direction)) so that the plurality of separators 12a are formed.

Take-up rollers 69a and 69b (first and second rolling sections) are provided one above the other in the slitting apparatus 6.

The plurality of separators 12a, into which the separator original sheet 12b is slit by the cutting sections 7, are conveyed to a roller 64 (separating mechanism) via a roller 78 (another roller). Out of the plurality of separators 12a conveyed to the roller 64, odd-numbered separators 12a (one or more of the plurality of separators) and even-numbered separators 12a (another one or more of the plurality of separators) are separated upward and downward by the roller 64, and then conveyed in different directions. The odd-numbered separators 12a are wound, via a roller 65, around a respective plurality of cores 81a which are fitted to the take-up roller 69a. The plurality of cores 81a correspond to the respective odd-numbered separators 12a. The even-numbered separators 12a are wound, from the roller 64, around a respective plurality of cores 81b which are fitted to the take-up roller 69b. The plurality of cores 81b correspond to the respective even-numbered separators 12a.

In a case where the plurality of separators 12a, into which the separator original sheet 12b is slit by the cutting sections 7, are conveyed, the plurality of separators 12a are preferably (i) conveyed to the roller 64, which is close to the take-up rollers 69a and 69b, via the single roller 78 without being separated and (ii) separated at the roller 64, because this simplifies a conveying mechanism and accordingly it is possible to reduce an occupied space, as compared with a case where the plurality of separators 12a are separated at the roller 77.

Note that Embodiment 1 has described an example in which (i) the odd-numbered separators 12a are wound up by the take-up roller 69a on an upper side and (ii) the even-numbered separators 12a are wound up by the take-up roller 69b on a lower side. However, the present invention is not limited to such a configuration. Alternatively, the odd-numbered separators 12a can be wound up by the take-up roller 69b on the lower side, and the even-numbered separators 12a can be wound up by the take-up roller 69a on the upper side.

In a case where the plurality of separators 12a are separated upward and downward and then wound up, it is possible to provide the take-up rollers 69a and 69b one above the other. This allows a reduction in area where the take-up rollers 69a and 69b are provided, as compared with a case where the take-up rollers 69a and 69b are provided one behind the other.

By providing the roller 78, it is possible to bring about the following advantage. That is, even in a case where a force is caused by vibration of the plurality of separators 12a at a position, on the roller 64, at which the plurality of separators 12a are separated, the force caused by the vibration is absorbed by the roller 78, so that it is possible to suppress an effect, on the cutting sections 7, of the force caused by the vibration.

Note that the slitting apparatus 6 can be alternatively configured such that the slitting apparatus 6 includes no roller 78 and the plurality of separators 12a are directly conveyed from the roller 77 to the roller 64.

Note also that Embodiment 1 has described an example in which the plurality of separators 12a are separated upward and downward and then wound up. However, the present invention is not limited to such a configuration. The plurality of separators 12a only need to be separated and conveyed in different directions. For example, the slitting apparatus 6 illustrated in FIG. 4 can be rotated by 90 degrees so that (i) the wind-off roller 61, the rollers 62, 63, 75, 76, 77, 78, 64, and 65, and the take-up rollers 69a and 69b, each of which has been horizontally provided, are vertically provided and (ii) the plurality of separators 12a are separated rightward and leftward and then wound up by the take-up rollers 69a and 69b.

Figure 6A:
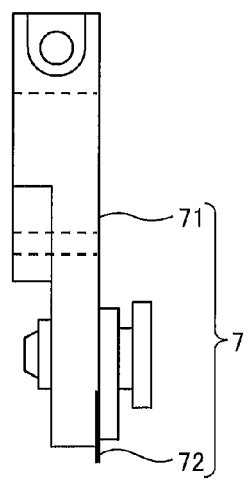
FIG. 6A is a side view illustrating a configuration of a cutting section of the slitting apparatus illustrated in FIG. 4.
Figure 6B:
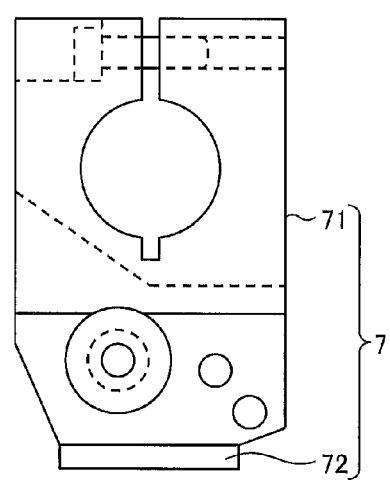
FIG. 6B is a front view illustrating the configuration of the cutting section.

FIG. 6A is a side view illustrating a configuration of a cutting section 7 of the slitting apparatus 6 illustrated in FIG. 4. FIG. 6B is a front view of the configuration of the cutting section 7. As illustrated in FIG. 6A and FIG. 6B, the cutting section 7 includes a holder 71 and a blade 72 (slitting blade). The holder 71 is fixed to a housing or the like provided in the slitting apparatus 6. The holder 71 holds the blade 72 in such a manner that the blade 72 and the separator original sheet 12b being conveyed have a fixed positional relationship. The blade 72 has a finely sharpened edge, and slits the separator original sheet 12b by using this edge.

Figure 7A:
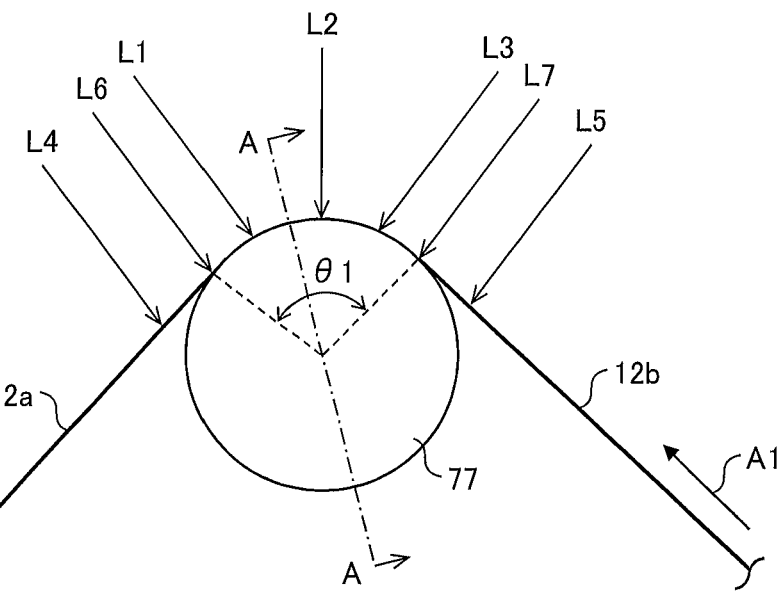
FIG. 7A is a schematic view for explaining a position at which the separator original sheet is slit.
Figure 7B:
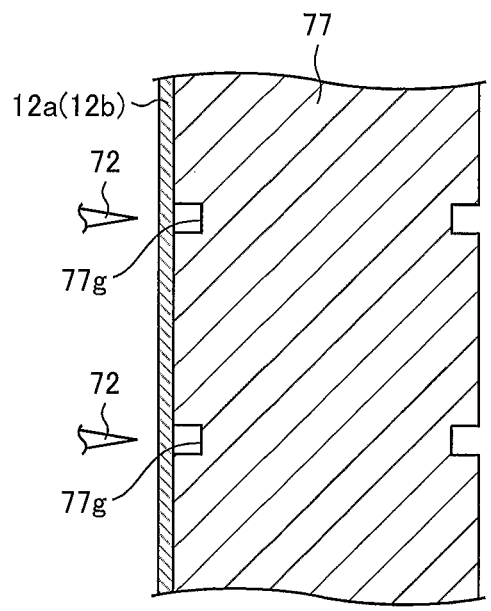
FIG. 7B is a cross-sectional view taken along a plane A-A illustrated in FIG. 7A.

FIG. 7A is a schematic view for explaining a position at which the separator original sheet 12b is slit. FIG. 7B is a cross-sectional view taken along a plane A-A illustrated in FIG. 7A.

It is assumed that the separator original sheet 12b is slit, by blades 72 (FIG. 6A and FIG. 6B) of the cutting sections 7, at a position L4 or L5 at each of which the separator original sheet 12b is not wound on the roller 77 and floats in air, a position L7 (start position) at which the separator original sheet 12b starts to be wound on the roller 77, or a position L6 (end position) at which winding of the separator original sheet 12b on the roller 77 ends. In this case, it is highly likely that a tear is caused in an unexpected direction of the plurality of separators 12a, each of which is a porous separator having fine pores in submicron order.

In Embodiment 1, the separator original sheet 12b being conveyed in a direction of an arrow A1 is slit, by the blades 72 (FIG. 6A and FIG. 6B) of the cutting sections 7, at a position L1, L2 (middle position), or L3 each of which corresponds to a portion of the separator original sheet 12b which portion is wound on the roller 77 (which portion is in contact with the roller 77). The position L2 corresponds to a middle point on a circumferential surface of the roller 77 which middle point corresponds to a midpoint of a straight line via which the position L7, at which the separator original sheet 12b starts to be wound on the roller 77, and the position L6, at which the winding of the separator original sheet 12b ends, are connected to each other. The portion of the separator original sheet 12b which portion is wound on the roller 77 is in a state of being stretched so as not to have a wrinkle, due to a frictional force that occurs between a back surface of the separator original sheet 12b and the circumferential surface of the roller 77. Therefore, it is possible to stably slit the separator original sheet 12b.

The separator original sheet 12b is preferably slit at the position L1 on a downstream side of the position L2 corresponding to the middle point, because the blade 72 can be easily replaced with another. Furthermore, in a case where the separator original sheet 12b is slit at the position L1 on the downstream side of the position L2, this causes the separator original sheet 12b to be slit after being conveyed longer distance in a state of being in contact with the roller 77. That is, the separator original sheet 12b is slit after being held by the roller 77 for a longer time. Therefore, it is possible to more stably slit the separator original sheet 12b, so that a tear is less caused in the separators.

Grooves 77g are formed at respective positions, corresponding to the respective blades 72 of the cutting sections 7, on the circumferential surface of the roller 77. A diameter of the roller 77 is approximately 80 mm. A width in a transverse direction (TD: Transverse Direction) of the separator original sheet 12b is, for example, 300 mm to 2,000 mm. A thickness of the separator original sheet 12b is, for example, 5 μm to 30 μm. A pitch between the grooves 77g is, for example, 33 mm to 300 mm. Each width of the grooves 77g is, for example, 0.8 mm. Each depth of the groves 77g is, for example, 5 mm.

A winding angle θ1 at which the separator original sheet 12b and the plurality of separators 12a are wound on the roller 77 is preferably not less than 60 degrees so that (i) the separators are stably held and accordingly occurrence of a tear in an unexpected direction is suppressed and (ii) a wrinkle is prevented from occurring in the separators. Further, the winding angle θ1 is preferably not more than 225 degrees so that (i) contamination of the separators by a chip or the like is suppressed and (ii) a conveyance route along which the separators are conveyed is easily arranged. Further, a winding angle on an upstream side of a slit position, at which the separator original sheet 12b is slit by the blades 72 of the cutting sections 7, is preferably (i) not less than 30 degrees so that transmission, to the slit position, of vibration of the separator original sheet 12b on an upstream side is suppressed and (ii) not more than 135 degree so that the conveyance route is easily arranged. A winding angle on a downstream side of the slit position is preferably not less than 30 degrees so that transmission, to the slit position, of vibration of the plurality of separators 12a on a downstream side is suppressed and (ii) not more than 90 degrees so that the conveyance route is easily arranged.

In a case where the heat-resistant layer 4 (FIG. 3A and FIG. 3B) is applied on one surface of the separator original sheet 12b, it is preferable that the separator original sheet 12b is (i) wound on the roller 77 so that the heat-resistant layer 4 is in contact with the roller 77 and (ii) slit, by the blades 72 of the cutting sections 7, from the other surface of the separator original sheet 12b on which surface no heat-resistant layer 4 is applied. This is because, in a case where the separator original sheet 12b is slit, by the blades 72, from the one surface of the separator original sheet 12b on which surface the heat-resistant layer 4 is applied, the heat-resistant layer 4 may come off the separator original sheet 12b. That is, it is preferable that the separator original sheet 12b is (i) wound on the roller 77 so that the one surface of the separator original sheet 12b, on which surface the heat-resistant layer 4 is formed, is in contact with the roller 77 and (ii) slit on the roller 77 by the blades 72 which are provided on a side of the other surface of the separator original sheet 12b on which surface no heat-resistant layer 4 is formed.

A method of winding off the separator original sheet from the core 53 to the route U is referred to as an upper winding-off method, whereas a method of winding off the separator original sheet from the core 53 to the route L is referred to as a lower winding-off method. It is assumed that the separator original sheet is slit while being wound off by the upper winding-off method and the resultant separators (products) are wound up by an upper winding method. In this case, the separator original sheet wound around the core 53 is identical to the separators wound around the respective plurality of cores 81a and 81b in that the same surface faces outside. However, in a case where the separator original sheet is slit while being wound off by the lower winding-off method and the separators (products) are wound up by the upper winding method, the separator original sheet wound around the core 53 is different from the separators wound around the respective plurality of cores 81a and 81b in that different surfaces face outside.

Embodiment 2

Figure 8:
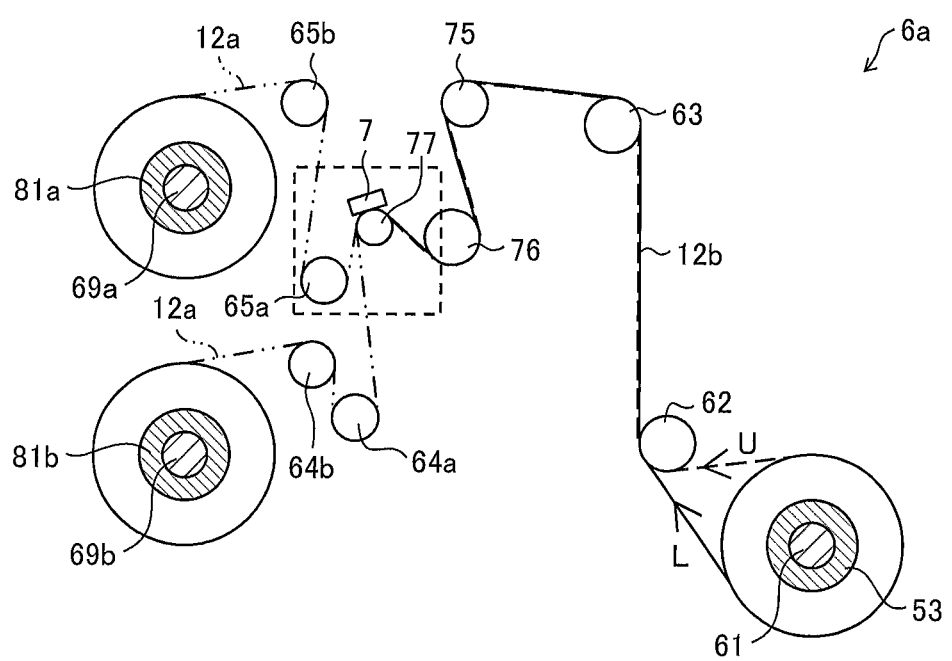
FIG. 8 is a front view illustrating a configuration of a slitting apparatus in accordance with Embodiment 2.

FIG. 8 is a front view illustrating a configuration of a slitting apparatus 6a in accordance with Embodiment 2. In the following description, identical reference numbers will be given to respective components identical to those described in Embodiment 1, and the components will not described in detail.

A difference between the slitting apparatus 6 in accordance with Embodiment 1 and the slitting apparatus 6a in accordance with Embodiment 2 is that a separation position (roller 64) of the slitting apparatus 6 of Embodiment 1, at which position the plurality of separators 12a are separated, is provided on the second roller from a slit position (roller 77), whereas the slitting apparatus 6a of Embodiment 2 is configured such that processes, from slitting a separator original sheet 12b to separating a plurality of separators 12a thus obtained, are concluded on an identical roller (roller 77).

Figure 9:
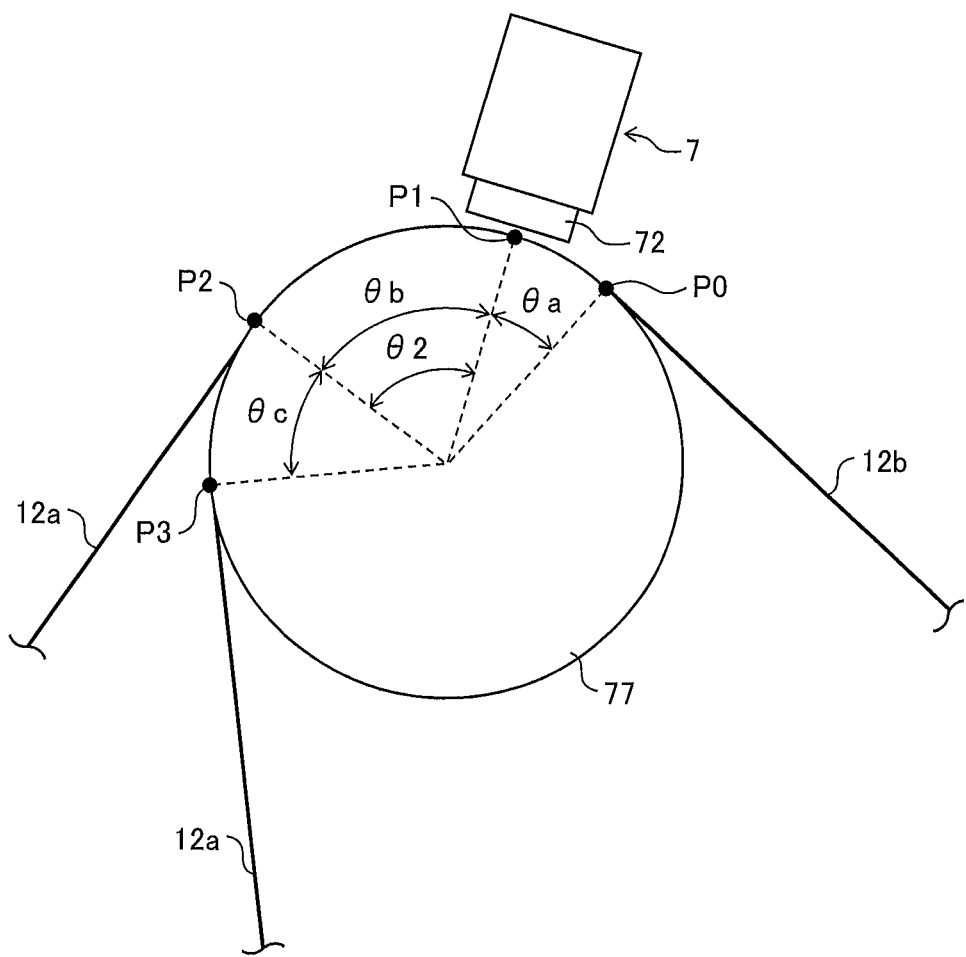
FIG. 9 is a schematic view for explaining a slit position and a separation position of the slitting apparatus.

FIG. 9 is a schematic view for explaining a slit position and a separation position of the slitting apparatus 6a.

With reference to FIGS. 8 and 9, the separator original sheet 12b is slit, by blades 72 of cutting sections 7, into the plurality of separators 12a at a slit position P1 on the roller 77 (separating mechanism). Out of the plurality of separators 12a, odd-numbered separators 12a (one or more of the plurality of separators) are separated from even-numbered separators 12a at a separation position P2 on the roller 77, conveyed via roller 65a and 65b to a take-up roller 69a, and wound around a respective plurality of core 81a which are correspond to the respective odd-numbered separators 12a and which are fitted to the take-up roller 69a. Out of the plurality of separators 12a, the even-numbered separators 12a (another one or more of the plurality of separators) are conveyed via rollers 64a and 64b to a take-up roller 69b, and wound around a respective plurality of cores 81b which are correspond to the respective even-numbered separators 12a and which are fitted to the take-up roller 69b.

Note that Embodiment 2 has described an example in which (i) the odd-numbered separators 12a are wound up by the take-up roller 69a on an upper side and (ii) the even-numbered separators 12a are wound up by the take-up roller 69b on a lower side. However, the present invention is not limited to such a configuration. Alternatively, the odd-numbered separators 12a can be wound up by the take-up roller 69b on the lower side, and the even-numbered separators 12a can be wound up by the take-up roller 69a on the upper side.

An angle $\theta 2$ formed by (i) a straight line via which the center of the roller 77 is connected to the slit position P1 and (ii) a straight line via which the center of the roller is connected to the separation position P2 is approximately 75 degrees. A diameter of the roller 77 is 80 mm. Therefore, a distance on the roller 77 between the slit position P1 and the separation position P2 is $80 \times \pi \times (75/360) = 52.3$ mm.

It is assumed that an angle between (i) a start position P0 at which the separator original sheet 12b starts to be wound on the roller 77 and (ii) the slit position P1 is a winding angle $\theta a$. It is also assumed that an angle between (i) the slit position P1 and (ii) an end position P2 at which winding of the odd-numbered separators 12a ends is a winding angle $\theta b$ ($=\theta 2$). It is also assumed that an angle between (i) the separation position P2 and (ii) an end position P3 at which winding of the even-numbered separators 12a ends is a winding angle $\theta c$.

The winding angle $\theta a$ is preferably not less than 30 degrees so that transmission, to the slit position, of vibration of the separator original sheet 12b on an upstream side is suppressed. The winding angle $\theta a$ is preferably not more than 135 degrees so that a conveyance route is easily arranged. The winding angle $\theta b$ is preferably not less than 30 degrees so that (i) the plurality of separators 12a are stably held and accordingly occurrence of a tear in an unexpected direction of the plurality of separators 12a is suppressed and (ii) transmission, to the slit position, of vibration of the odd-numbered separators 12a on a downstream side is suppressed. The winding angle $\theta c$ is preferably not less than 15 degrees so that interference of adjacent ones of the plurality of separators 12a with each other is suppressed. A winding angle ($\theta b + \theta c$) is preferably not more than 90 degrees so that the conveyance route is easily arranged. Therefore, the winding angle $\theta b$ is preferably not more than 75 degrees. A winding angle ($\theta a + \theta b + \theta c$), at which the separator original sheet 12b and the plurality of separators 12a are wound on the roller 77, is preferably not more than 225 degrees so that (i) contamination of the plurality of separators 12a by a chip or the like is suppressed and (ii) the conveyance route is easily arranged. Further, the winding ($\theta a + \theta b + \theta c$) is preferably not less than 75 degrees so that a wrinkle is prevented from occurring in the separators.

In a case where the slit position P1 and the separation position P2 are provided on an identical roller, a distance between the slit position P1 and the separation position P2 is short, as compared with a case where the separation position P2 is provided on a roller on a downstream side of a roller on which the slit position P1 is provided. A short distance between the slit position P1 and the separation position P2 results in a short distance of conveyance of the plurality of separators 12a, into which the separator original sheet 12b is slit at the slit position P1, being conveyed while being adjacent to each other. Therefore, for example, it is possible to prevent any one of the plurality of separators 12a from being conveyed while skewing and overlapping adjacent one of the plurality of separators 12a.

SUMMARY

A method for producing a separator in accordance with an aspect of the present invention is a method for producing a separator by slitting, in a direction in which a separator original sheet being porous is conveyed, the separator original sheet into a plurality of separators, the method including the steps of: (a) conveying the separator original sheet in a state where the separator original sheet is in contact with a roller; and (b) slitting the separator original sheet at a portion where the separator original sheet is in contact with the roller.

Note here that the "separator original sheet" means a broad separator which has not been slit. The "a direction in which a separator original sheet . . . is conveyed" corresponds to a lengthwise direction (MD: Machine Direction) of the separator original sheet, and corresponds to a direction in which a subject to be produced is conveyed in the steps of producing the separator.

According to the above feature, the separator original sheet is slit at the portion where the separator original sheet is in contact with the roller. That is, the separator original sheet is slit in a state where the separator original sheet is held on the roller. This (i) causes behavior of the separator original sheet to be stable at the portion at which the separator original sheet is slit and (ii) accordingly allows acting of an unnecessary force on the slit part to be suppressed. It is therefore possible to suppress occurrence of a tear in an unexpected direction of such a porous separator. As a result, it is possible to provide a method for producing a separator which method less causes a tear in the separator.

The method for producing a separator in accordance with an aspect of the present invention is preferably arranged such that: in the step (b), the separator original sheet is slit by a slitting blade provided on a side of the separator original sheet which side is opposite to a side on which the roller is provided; and the roller has a groove at a position corresponding to the slitting blade.

According to the above configuration, the grove is formed at the position corresponding to the slitting blade. It is therefore possible to avoid a situation in which an edge of the slitting blade is in contact with the roller, and possible to suppress occurrence of wear on the edge and production of a chip.

The method for producing a separator in accordance with an aspect of the present invention is preferably arranged such that one or more of the plurality of separators and another one or more of the plurality of separators are separated in respective different directions.

The above configuration allows the plurality of separators to be separated in different directions and then wound up. It is therefore possible to provide adjacent winding devices at respective positions where the adjacent winding devices do not interfere with each other.

The method for producing a separator in accordance with an aspect of the present invention is preferably arranged such that one or more of the plurality of separators and another one or more of the plurality of separators are separated on a downstream side of a position at which the separator original sheet is slit in the step (b).

In a case where a separation position at which the plurality of separators are separated and a slit position at which the separator original sheet is slit are the same position, a force caused by vibration acts on the plurality of separators being separated in the different directions, while the separator original sheet is being slit. This causes the plurality of separators being separated to be unstable and may cause a tear in an unexpected direction of the plurality of separators. However, according to the above configuration, it is possible to reduce such a risk.

The method for producing a separator in accordance with an aspect of the present invention is preferably arranged such that at least another roller is provided between (i) a position at which the one or more of the plurality of separators and the another one or more of the plurality of separators are separated and (ii) a position at which the separator original sheet is slit in the step (b).

According to the above configuration, even in a case where a force caused by vibration acts on the plurality of separators at the position at which the plurality of separators are separated, the force caused by the vibration is absorbed by the another roller, so that it is possible to suppress an effect, on the above slitting step, of the force caused by the vibration.

The method for producing a separator in accordance with an aspect of the present invention is preferably arranged such that the one or more of the plurality of separators and the another one or more of the plurality of separators are separated on the roller.

According to the above configuration, it is possible to conclude, on an identical roller, processes from slitting the separator original sheet to separating the plurality of separators thus obtained. Furthermore, a distance between the slit position and the separation position is short, as compared with a case where the separation position is provided on a roller on a downstream side of a roller on which the slit position is provided. This results in a short a distance of conveyance of the plurality of separators, into which the separator original sheet is slit at the slit position, being conveyed while being adjacent to each other. Therefore, it is possible to prevent any one of the plurality of separators from being conveyed while skewing and overlapping adjacent one of the plurality of separators.

The method for producing a separator in accordance with an aspect of the present invention is preferably arranged such that the one or more of the plurality of separators and the another one or more of the plurality of separators are separated upward and downward, respectively, and wound up by respective first and second rolling sections which are provided one above the other.

According to the above configuration, it is possible to provide the first and second rolling sections (take-up rollers 69a and 69b) one above the other. This allows a reduction in area where the first and second rolling sections are provided, as compared with a case where the first and second rolling sections are provided one behind the other (horizontally).

The method for producing a separator in accordance with an aspect of the present invention is preferably arranged such that: a heat-resistant layer is formed on one surface of the separator original sheet; and in the step (b), the one surface of the separator original sheet is in contact with the roller, and the separator original sheet is slit by a slitting blade provided on a side of the other surface of the separator original sheet on which surface no heat-resistant layer is formed.

In a case where the separator original sheet is slit, by the slitting blade, from the one surface of the separator original sheet on which surface the heat-resistant layer is formed, the heat-resistant layer may easily come off the separator original sheet. The above configuration makes it possible to prevent the heat-resistant layer from coming off the separator original sheet in the slitting step.

The method for producing a separator in accordance with an aspect of the present invention is preferably arranged such that the separator original sheet is slit on an end position side of a middle position on a circumferential surface of the roller which middle position corresponds to a midpoint of a straight line via which a start position, at which the separator original sheet starts to be wound on the roller, and an end position, at which winding of the plurality of separators on the roll ends, are connected to each other.

According to the above configuration, the separator original sheet is slit after being held by the roller for a longer time. Therefore, it is possible to more stably slit the separator original sheet, so that a tear is less caused in the plurality of separators.

A method for producing a separator in accordance with an aspect of the present invention includes the steps of: (a) slitting, in a direction in which a separator original sheet being porous is conveyed, the separator original sheet into a plurality of separators; and (b) separating, on a downstream side of a position at which the separator original sheet is slit in the step (a), one or more of the plurality of separators and another one or more of the plurality of separators.

In a case where the separation position at which the plurality of separators are separated and the slit position at which the separator original sheet is slit are the same position, a force caused by vibration acts on the plurality of separators being separated, while the separator original sheet is being slit. This causes the plurality of separators being separated to be unstable and may cause a tear in an unexpected direction of the plurality of separators. However, according to the above configuration, it is possible to reduce such a risk.

A method for slitting a separator original sheet in accordance with an aspect of the present invention is a method for slitting, in a direction in which a separator original sheet being porous is conveyed, the separator original sheet into a plurality of separators, including the steps of: conveying the separator original sheet in a state where the separator original sheet is in contact with a roller; and slitting the separator original sheet at a portion where the separator original sheet is in contact with the roller.

A method for slitting a separator original sheet in accordance with an aspect of the present invention includes the steps of: (a) slitting, in a direction in which the separator original sheet is conveyed, the separator original sheet into a plurality of separators; and (b) separating, on a downstream side of a position at which the separator original sheet is slit in the step (a), one or more of the plurality of separators and another one or more of the plurality of separators.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a method for slitting a separator original sheet for use in a lithium-ion secondary battery and to a method for producing a separator.

REFERENCE SIGNS LIST

4 Heat-resistant layer
6 Slitting apparatus
7 Cutting section (slitting mechanism)
12 Separator
12a Heat-resistant separator (separator)
12b Heat-resistant separator original sheet (separator original sheet)
64 Roller (separating mechanism)
69a, 69b Take-up rollers (first and second rolling sections)
72 Blade (slitting blade)
77 Roller (separating mechanism)
77g Groove
78 Roller (another roller)
81 Core
L2 Position (middle position)
L6 Position (end position)
L7 Position (start position)

The invention claimed is:

1. A method for producing a separator, which is disposed between a positive electrode and a negative electrode of a lithium-ion secondary battery, by slitting, in a direction in which a separator original sheet being porous is conveyed, the separator original sheet into a plurality of separators, the method comprising the steps of:
(a) conveying the separator original sheet in a state where the separator original sheet is in contact with a roller; and
(b) slitting the separator original sheet at a portion where the separator original sheet is in contact with the roller.

2. The method as set forth in claim 1, wherein:
in the step (b), the separator original sheet is slit by a slitting blade provided on a side of the separator original sheet which side is opposite to a side on which the roller is provided; and
the roller has a groove at a position corresponding to the slitting blade.

3. The method as set forth in claim 1, wherein one or more of the plurality of separators and another one or more of the plurality of separators are separated in respective different directions.

4. The method as set forth in claim 1, wherein one or more of the plurality of separators and another one or more of the plurality of separators are separated on a downstream side of a position at which the separator original sheet is slit in the step (b).

5. The method as set forth in claim 3, wherein at least another roller is provided between (i) a position at which the one or more of the plurality of separators and the another one or more of the plurality of separators are separated and (ii) a position at which the separator original sheet is slit in the step (b).

6. The method as set forth in claim 4, wherein the one or more of the plurality of separators and the another one or more of the plurality of separators are separated on the roller.

7. The method as set forth in claim 3, wherein the one or more of the plurality of separators and the another one or more of the plurality of separators are separated upward and downward, respectively, and wound up by respective first and second rolling sections which are provided one above the other.

8. The method as set forth in claim 1, wherein:
a heat-resistant layer is formed on one surface of the separator original sheet; and
in the step (b), the one surface of the separator original sheet is in contact with the roller, and the separator original sheet is slit by a slitting blade provided on a side of the other surface of the separator original sheet on which surface no heat-resistant layer is formed.

9. The method as set forth in claim 1, wherein the separator original sheet is slit on an end position side of a middle position on a circumferential surface of the roller which middle position corresponds to a midpoint of a straight line via which a start position, at which the separator original sheet starts to be wound on the roller, and an end position, at which winding of the plurality of separators on the roll ends, are connected to each other.

10. A method for producing a separator for use in a lithium-ion secondary battery, comprising the steps of:
(a) slitting, in a direction in which a separator original sheet being porous is conveyed, the separator original sheet into a plurality of separators; and
(b) separating, on a downstream side of a position at which the separator original sheet is slit in the step (a), one or more of the plurality of separators and another one or more of the plurality of separators,
a heat-resistant layer being formed on one surface of the separator original sheet, and
in the step (b), the one surface of the separator original sheet being in contact with a roller, and the separator original sheet being slit by a slitting blade provided on a side of the other surface of the separator original sheet which surface is opposite to the one surface of the separator original sheet and on which surface no heat-resistant layer is formed.

11. A method for slitting, in a direction in which a separator original sheet being porous is conveyed, the separator original sheet into a plurality of separators each being disposed between a positive electrode and a negative electrode of a lithium-ion secondary battery, comprising the steps of:
conveying the separator original sheet in a state where the separator original sheet is in contact with a roller; and
slitting the separator original sheet at a portion where the separator original sheet is in contact with the roller.

12. A method for slitting a separator original sheet being porous, comprising the steps of:

(a) slitting, in a direction in which the separator original sheet is conveyed, the separator original sheet into a plurality of separators, each for use in a lithium-ion secondary battery; and (b) separating, on a downstream side of a position at which the separator original sheet is slit in the step (a), one or more of the plurality of separators and another one or more of the plurality of separators, wherein a heat-resistant layer is formed on one surface of the separator original sheet, and in the step (b), the one surface of the separator original sheet is in contact with a roller, and the separator original sheet is slit by a slitting blade provided on a side of the other surface of the separator original sheet which surface is opposite to the one surface of the separator original sheet and on which surface no heat-resistant layer is formed.

* * * * *